United States Patent [19]

Doss et al.

[11] 3,963,850

[45] June 15, 1976

[54] ADHESIVE FORMULATION IMPROVED WITH SOLID FILLERS

[75] Inventors: Richard C. Doss, Bartlesville; Faber B. Jones, Nowata, both of Okla.

[73] Assignee: Phillips Petroleum Company, Bartlesville, Okla.

[22] Filed: Sept. 29, 1970

[21] Appl. No.: 76,608

[52] U.S. Cl. .................. 428/286; 428/236; 260/8; 260/29.7 R; 260/29.7 H
[51] Int. Cl.$^2$ .......................... C08K 7/12
[58] Field of Search ............... 260/29.7 S, 41.5 A, 260/29.7 R, 29.7 H, 8; 161/253, 255; 156/334; 428/286

[56] References Cited
UNITED STATES PATENTS

| | | | |
|---|---|---|---|
| 3,131,158 | 4/1964 | Kemp | 260/29.7 H |
| 3,239,478 | 3/1966 | Harlan | 260/27 |
| 3,297,515 | 1/1967 | Regenstein | 156/334 |
| 3,314,911 | 4/1967 | Cull | 260/29.7 S |
| 3,409,569 | 11/1968 | Lane | 260/8 |
| 3,484,338 | 12/1969 | Britton | 260/29.7 H |
| 3,547,669 | 12/1970 | Battista | 106/272 |
| 3,583,932 | 6/1971 | Benton | 260/8 |

FOREIGN PATENTS OR APPLICATIONS 359,424  7/1936  Canada

OTHER PUBLICATIONS

Schue, *Spe Journal*, vol. 25, pp. 40–43 (July 1969).
*Cab–O–Sil: How to Use It, Where to Use It*; pp. 24–27, copyright 1969 by Cabot Corporation.

*Primary Examiner*—Paul R. Michl

[57] ABSTRACT

A porous web-like substrate is treated with an adhesive containing a filler which increases the viscosity of the adhesive thereby inhibiting flow of the adhesive through the pores of the substrate, and increases the amount of the adhesive retained on the surface of the substrate. In a preferred embodiment a high surface area siliceous material is added to a carboxylated styrenebutadiene latex adhesive to improve adhesion of porous substrates.

2 Claims, No Drawings

ADHESIVE FORMULATION IMPROVED WITH SOLID FILLERS

This invention relates to the adhesion of porous substrates. In one of its aspects, it relates to the production of bonded substrates. In another of its aspects, this invention relates to viscous adhesive formulations. In still another aspect, this invention relates to the addition of nonadhesive filler to adhesive formulations.

In one concept of the invention it provides a method for increasing adhesion of porous web-like substrates by retaining more adhesive on the surface of the substrates.

In another of its concepts, this invention provides a method for retaining more adhesive on the surface of the porous substrate by increasing the viscosity of the adhesive applied to the substrate.

In still another of its concepts, this invention provides a method for increasing the viscosity of the adhesive applied to a substrate by addition of a filler compound to the adhesive formulation.

A problem in adhering porous web-like substrates has been the tendency of adhesive to flow through the pores of the substrate away from the surface to be bonded. This problem is particularly apparent in the nonwoven materials made of polyolefin fiber which are often used as carpet backing. Although various methods for improving the adhesion of porous web-like substrates have been proposed, such as treating the substrate with heat, flame or electrical discharge, to provide an oxidized surface for adhesion, the method of this invention offers a practical means for increasing the adhesion of porous substrate using an improved adhesive formulation based on currently accepted adhesive formulations without surface treatment of the substrate.

It is therefore an object of this invention to provide an adhesive composition of increased effectiveness in bonding porous web-like substrates.

It is another object of this invention to produce a strongly bonded laminate containing at least one porous substrate.

It is still another object of this invention to provide a method for increasing the adhesion of porous web-like substrates.

According to the present invention there is provided an adhesive composition comprising a recognized adhesive formulation to which has been added a filler, the adhesive composition then being of sufficient viscosity to be retained on the surface of the porous substrate to which it is applied.

In one of its embodiments the invention provides a laminate containing at least one porous substrate bonded to another substrate with an adhesive layer containing a filler.

In another of its embodiments this invention provides a method for increasing the adhesion of a porous substrate to another substrate which comprises the addition of a filler material to the adhesive composition applied to the porous substrate to increase the viscosity of the adhesive composition so that it is retained on the surface of the porous substrate which is to be bonded to another surface.

The solid filler materials suitable for increasing the viscosity of adhesive compositions of this invention can be any high surface area material such as carbon black, silica, alumina, and the like, having a surface area in the range of 20–1000 m$^2$/g., preferably 100–300 m$^2$/g.

A siliceous material is preferred such as expanded silica, asbestos, mica, and the like. In the preferred embodiment of this invention any silica that imparts thixotropic properties to the adhesive can be used.

The filler material is effective in increasing the viscosity of a wide variety of adhesives. Any of the known adhesive compositions which are applied in the fluid state are suitable for use in this invention. Among the preferred adhesives are those particularly adapted for use in the carpet industry such as latex based adhesives and water emulsified or suspended natural product adhesives, e.g., casein and soy bean protein adhesives. In a preferred embodiment the adhesion of substrates bonded with carboxylated styrene-butadiene latex adhesives is found particularly to be improved by addition of a filler to the adhesive composition.

The bonding of porous web-like substrates in general is more effective using this invention. This invention is particularly effective with nonwoven backings such as those used in the manufacture of carpeting. In a preferred embodiment a nonwoven material of polyolefin fiber is effectively bonded to another substrate.

It has been found that a finite amount of filler material up to about 5 percent by weight of the total adhesive composition, preferably in the range up to about 3 percent by weight of the total adhesive composition, produces a composition that effectively increases the retention of the composition on the stratum surface and retains sufficient fluidity for application. Any of the known means for applying a fluid adhesive to a substrate can be used by the method of this invention such as painting, spraying, pouring, troweling, and the like.

The filler material of this invention can be included in the adhesive composition as the composition is originally made or the filler material may be added to the adhesive composition at any time before application. The filler material is mixed with the adhesive composition to form a homogeneous fluid.

The following examples are meant to be illustrative and are not to be taken as limiting.

EXAMPLE I

Three grams MS-7 Cab-O-Sil, an expanded silica made by the Cabot Corporation described in their bulletin 2334/869, was mixed with 148 grams of a conventional carboxylated SBR latex adhesive made in the following formulation:

| Adhesive | g |
|---|---|
| Dow 819 Latex (a carboxylated styrene-butadiene rubber) | 353.00 |
| Distilled water | 72.00 |
| Tetrasodium pyrophosphate | 1.28 |
| Whiting No. 10 | 386.00 |
| 0.9 grams Natrosol 250 HHR in 10 ml water | |

This addition yielded a composition of three weight per cent Cab-O-Sil which increased the viscosity of the adhesive from about 1,000 to about 5,500 centipoises.

EXAMPLE II

Approximately 22 grams of the above adhesive was added to a 5.5 inch by 10 inch section of canvas ducking or Loktuft*, which is polypropylene nonwoven carpet backing made by Phillips Petroleum Company, and spread evenly by means of a glass rod. A 5.5 inch patch of Loktuft* was placed over the adhesive and the laminate pressed gently with a roller. After 10–15 minutes at room temperature, the bonded assembly was placed in an oven at 150°F. for 10 minutes in a vertical position with two 2-pound weights hanging from the bottom near the corners. The assembly was then cooled. One-inch wide strips of bonded Loktuft* were cut and these were employed in T-peel strength determinations (Instron Model TT, crosshead speed: 12 inches per minute).

| Wt. % Cab-O-Sil in Adhesive | Substrates | Viscosity of Adhesive, cps. 25°C. | T-Peel Range lbs/in. Width |
|---|---|---|---|
| 0 | Loktuft* (a) - Canvas duck | 1000 | 2.5 – 3.5 |
| 3 | Loktuft* - Canvas duck | 5500 | 4.0 – 12.0 (b) |
| 3 | Loktuft* - Loktuft* | 5500 | 10 – 15 |

(a) *Trademark, Phillips Petroleum Company.
(b) Loktuft* failed.

The examples above show the preparation of a typical filler-improved adhesive formulation of this invention and the improvement of adhesion of porous strata using the adhesive formulation.

EXAMPLE III

An adhesive formulation was prepared in the manner of Example I using General Latex adhesive 2-S-3056-C which is basically a styrene-butadiene rubber and is 67.7 percent solids and 3 percent by weight of the total formulation of an additive filler material. The formulations were applied in the manner of Example II onto Loktuft* at a spread level calculated to be equivalent to 30 ounces per square yard. Each test section consisting of Loktuft* using adhesive with various fillers or with varied bonded surface treatment wAs heated at 250°F. for 25 minutes before testing. One inch by 6 inch bonded specimens were evaluated using an Instron test machine at a crosshead speed of 12 inches per minute with the following results:

| Adhesive System | Viscosity, cps | Loktuft* Surface Pretreatment | Peel Strength ppiw |
|---|---|---|---|
| Latex adhesive (a) | 8000 | None | 2.5 |
| Latex adhesive | 8000 | Corona discharge | 3.0 |
| Latex adhesive | 8000 | Flame | 3.3 |
| Latex adhesive | 8000 | Finish removed | 3.3 |
| Latex adhesive + asbestos float (b) | 12000 | None | 3.5 |
| Latex adhesive + Cab-O-Sil (b) (c) | 17500 | None | 3.3 |

(a) General Latex, 2-S-3056-C
(b) 3 wt. per cent.
(c) MS-7, Cabot Corporation.

The above Example illustrates that bonding of porous substrates can be improved by addition of high surface siliceous matter to the formulation and that the results obtained with the improved adhesive are equal to or better than those achieved using known methods of porous substrate treatment, especially considering that surface treatment requires additional equipment.

Reasonable variation and modification are possible within the scope of the foregoing disclosure and the appended claims to the invention the essence of which is that addition of a filler material to an adhesive composition causes retention of adhesive composition on the surface of a porous substrate increasing the adhesion of the porous substrate to another substrate.

We claim:

1. A laminate consisting of at least one substrate of porous web-like material bonded to at least one other porous web-like substrate by an adhesive composition consisting essentially of a carboxylated styrene-butadiene and at least one of casein and soy bean protein adhesives said composition having incorporated therein up to about 5 percent by weight of a high surface area asbestos filler material.

2. A method for bonding a porous web-like substrate to another substrate comprising applying to the surface of one of said substrates an adhesive composition in a fluid state said adhesive consisting essentially of carboxylated styrene-butadiene and at least one of casein and soy bean adhesives said composition having incorporated therein up to about 5 percent by weight of a high surface area asbestos filler material, pressing said substrates into contact enclosing said filled adhesive composition and allowing said adhesive composition to set producing a laminate.

* * * * *